No. 731,960. PATENTED JUNE 23, 1903.
E. C. SHERMAN.
PLANT SUPPORT.
APPLICATION FILED JUNE 18, 1902.
NO MODEL. 2 SHEETS—SHEET 1.
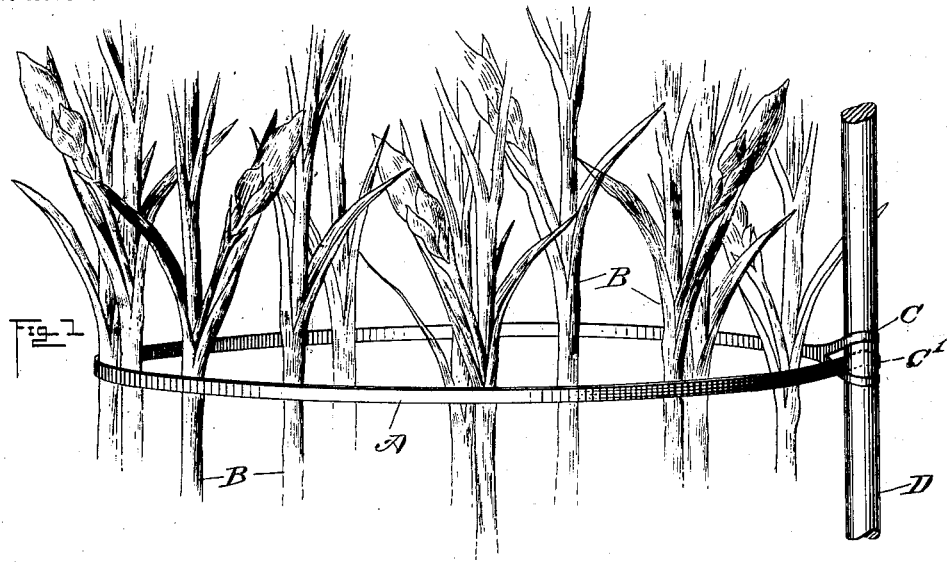
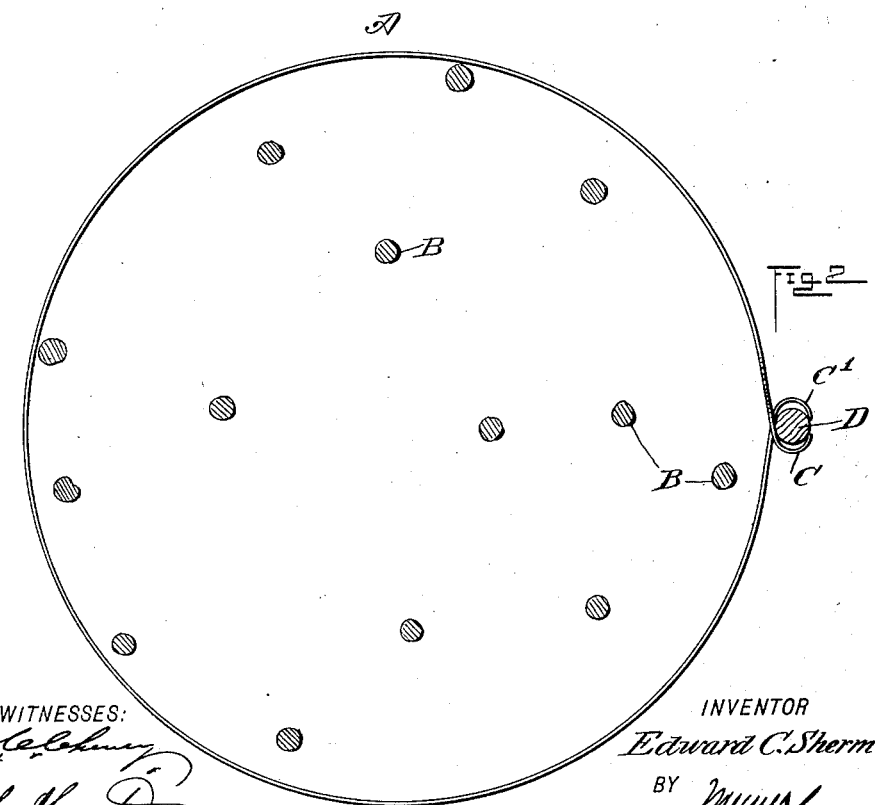
WITNESSES:
INVENTOR
Edward C. Sherman
BY
ATTORNEYS.

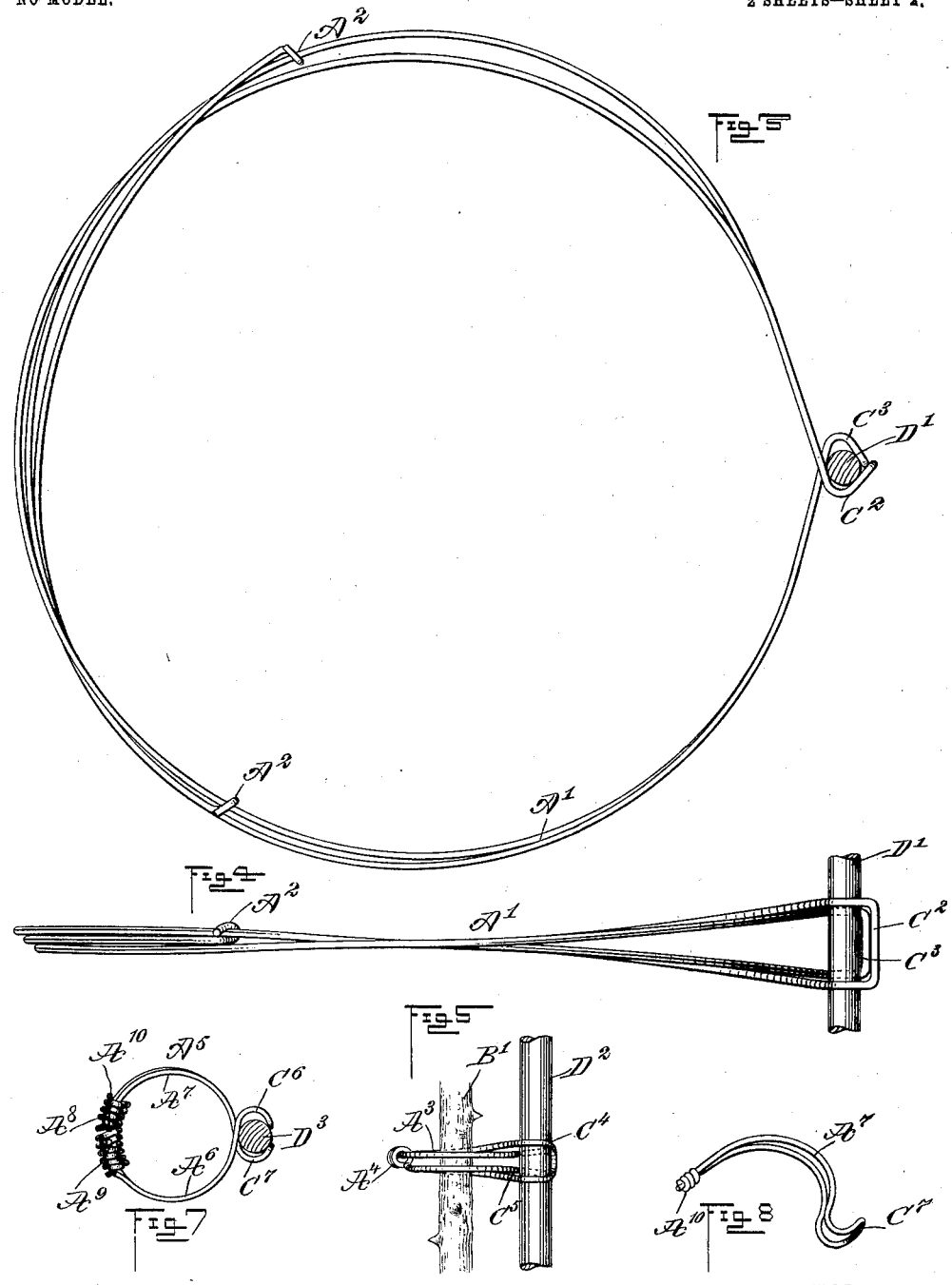

No. 731,960.

Patented June 23, 1903.

UNITED STATES PATENT OFFICE.

EDWARD C. SHERMAN, OF LAWRENCE, NEW YORK.

PLANT-SUPPORT.

SPECIFICATION forming part of Letters Patent No. 731,960, dated June 23, 1903.

Application filed June 18, 1902. Serial No. 112,164. (No model.)

*To all whom it may concern:*

Be it known that I, EDWARD C. SHERMAN, a citizen of the United States, and a resident of Lawrence, in the county of Nassau and State of New York, have invented a new and Improved Plant-Support, of which the following is a full, clear, and exact description.

The invention relates to devices for holding plants to stakes, wires, or other fixed supports; and its object is to provide a new and improved plant-support which is simple and durable in construction, easily applied, and arranged to securely hold the stems or other parts of the plant in proper and secure position on the stake, wire, or other similar fixed support without danger of injury to the plant or interfering in the least with the natural growth of the plant.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement as applied and arranged for holding a plurality of carnations in position. Fig. 2 is a plan view of the same, showing the stake and carnations in section. Fig. 3 is a similar view of a modified form of the improvement, the stake being shown in section. Fig. 4 is a side elevation of the same. Fig. 5 is a similar view of another modified form of the improvement arranged for holding the stem of a single plant, such as a rose, to a stake. Fig. 6 is a sectional plan view of the improvement applied on a stake. Fig. 7 is a similar view of another modified form of the improvement, and Fig. 8 is a perspective view of one of the members of the modified form shown in Fig. 7.

The improved support consists of an open hoop A, of a resilient nature, adapted to embrace loosely the stem or stems B of a plant, as illustrated in Figs. 1 and 2. The ends of the said open hoop terminate in outward return-bends, forming open hooks C C', adapted to cross each other and engage opposite sides of a stake, wire, or like support D, it being understood that the hoop is held in a closed position on the said support by the resiliency of the hoop, which latter is projected at an angle from the support to allow the free and unhindered passage of the stem or stems B.

The improved support illustrated in Figs. 1 and 2 is formed of a flat steel band, preferably oval in cross-section, and the hook C is split or divided, so as to form a passage to allow the other hook C' to pass between the members of the hook C, as will be readily understood by reference to Fig. 1. The oval form of the hoop prevents chafing of the stems.

In the modified form illustrated in Figs. 3 and 4 the hoop A' is formed of a single piece of spring-wire, doubled up to form hooks $C^2$ $C^3$, engaging opposite sides of the support D', the ends of the wire being formed into loops $A^2$, engaging adjacent members of the hoop A'.

In the modified form shown in Figs. 5 and 6 the hoop $A^3$ is likewise formed of a single piece of wire, but is more especially designed to engage a single stem B', of a rose or like plant, and the said wire is doubled up to form the hooks $C^4$ $C^5$, engaging opposite sides of the stake $D^2$, and one of the members of the hoop $A^3$ is formed at its middle into a coil $A^4$, into which project the ends of the other member—that is, the terminals of the wire.

In the modified form illustrated in Figs. 7 and 8 the hoop $A^5$ is made in three parts $A^6$ $A^7$ $A^8$, of which the parts $A^6$ and $A^7$ are segmental in shape and terminate at one end in the hooks $C^6$ $C^7$, engaging opposite sides of the stake $D^3$, while the third member $A^8$ is in the form of a spring-coil, into which screw the ends $A^9$ $A^{10}$ of the parts $A^6$ $A^7$.

In each of the cases, however, the hooks cross each other and engage opposite sides of the supports D D' $D^2$ $D^3$, and the hooks are the terminals of the hoop and are bent inwardly in a backward direction and held in contact with opposite sides of the stake by the resiliency of the hoop.

By the arrangement described the support can be readily applied by passing the open hoop around the stems B B', so that the latter extend through the hoop, and then pressing the sides of the hoop till the hooks cross each other a sufficient distance to allow the hooks to clamp opposite sides of the stake when the operator releases the pressure on the sides of the hoop, it being understood that the resiliency of the hoop now presses the hooks into firm contact with opposite sides of the stake, as the said resiliency tends to open the hoop, but is barred from doing so by the engagement of the hooks on opposite sides of the stake.

The device is very simple and durable in construction, can be cheaply manufactured, and readily applied, so that the stems of the plant have a completely free and unhindered passage without interfering with the natural growth of the plant.

Having thus described my invention, I claim as new and desire to secure by Letters Patent—

1. A plant-support comprising a spring-hoop having its ends terminating in outward return-bends forming open hooks, adapted to engage opposite sides of a support; one of said hooks being formed of sections sufficiently separated from each other to receive the other hook between them as specified and for the purpose set forth.

2. A plant-support, comprising a spring-hoop having its end terminating in outward return-bends forming open hooks, adapted to engage opposite sides of a support, one end of said hoop being bifurcated and the other end received between said bifurcations, as specified and for the purpose set forth.

In testimony whereof I have signed my name to this specification in the presence of two subscribing witnesses.

EDWARD C. SHERMAN.

Witnesses:
 THEO. G. HOSTER,
 EVERARD BOLTON MARSHALL.